(12) United States Patent
Krenzer et al.

(10) Patent No.: US 7,364,390 B2
(45) Date of Patent: Apr. 29, 2008

(54) DRILLING TOOL

(75) Inventors: Ulrich F. Krenzer, Zirndorf (DE); Herbert Kauper, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 200 days.

(21) Appl. No.: 11/351,869

(22) Filed: Feb. 10, 2006

(65) Prior Publication Data

US 2006/0198708 A1    Sep. 7, 2006

Related U.S. Application Data

(63) Continuation of application No. PCT/EP2004/008987, filed on Aug. 11, 2004.

(30) Foreign Application Priority Data

Aug. 13, 2003  (DE) .............................. 103 37 203.2

(51) Int. Cl.
*B23B 51/02*    (2006.01)
(52) U.S. Cl. ...................... 408/230; 408/227
(58) Field of Classification Search ............... 408/226, 408/227, 229, 230; 175/394
See application file for complete search history.

(56) References Cited

U.S. PATENT DOCUMENTS

| 260,314 | A | * | 6/1882 | Parks et al. ............... 408/230 |
| 443,297 | A | * | 12/1890 | Sellers ..................... 408/213 |
| 507,598 | A | * | 10/1893 | Sellers ..................... 279/114 |
| 574,077 | A | * | 12/1896 | Sellers ..................... 279/59 |
| 1,131,991 | A | * | 3/1915 | Bocorselski ............... 408/230 |
| 1,964,030 | A | | 6/1934 | Brush ....................... 175/383 |
| 1,987,504 | A | * | 1/1935 | Denz ........................ 279/49 |
| 2,567,471 | A | * | 9/1951 | Sven et al. ................ 279/4.03 |
| 2,609,209 | A | * | 9/1952 | Perman ..................... 279/49 |
| 3,136,561 | A | * | 6/1964 | McAuliffe et al. ......... 279/46.4 |
| 3,531,810 | A | | 9/1969 | Fure |
| 4,412,764 | A | | 11/1983 | Wawrzniak |
| 4,902,177 | A | | 2/1990 | Burnett |
| 5,188,378 | A | | 2/1993 | Erlenkeuser |
| 5,704,745 | A | * | 1/1998 | Wiker et al. ............... 408/238 |
| 5,807,041 | A | | 9/1998 | Lindblom |
| 5,947,659 | A | * | 9/1999 | Mays ........................ 408/211 |
| 6,000,887 | A | | 12/1999 | Hoefler et al. |
| 2002/0172569 | A1 | | 11/2002 | Nakamura |

FOREIGN PATENT DOCUMENTS

| DE | 1752616 | | 6/1968 |
| DE | 2946103 | A | 5/1981 |
| DE | 19955172 | A | 5/2001 |

(Continued)

*Primary Examiner*—Monica Carter
*Assistant Examiner*—Eric A. Gates
(74) *Attorney, Agent, or Firm*—Nils H. Ljungman & Associates

(57) ABSTRACT

Disclosed is a drilling tool comprising a first drill bit (2) that is provided with at least two forward cutting edges (4, 5) and a second drill bit (3) which encompasses at least two rear cutting edges (6, 7). A cutting groove (8, 9) runs continuously from one respective forward cutting edge (4, 5) to a rear cutting edge (6, 7). Said cutting groove (8, 9) is embodied in an asymmetric manner in an area (A) bordering the forward drill bit (2), in a symmetric manner in a central area (B), and asymmetric in an area (C) bordering the rear drill bit (3).

20 Claims, 9 Drawing Sheets

FOREIGN PATENT DOCUMENTS

Figure 4B:
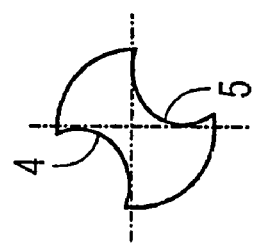
Figure 5B:
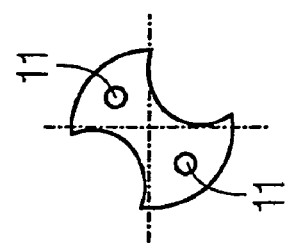
Figure 4A:
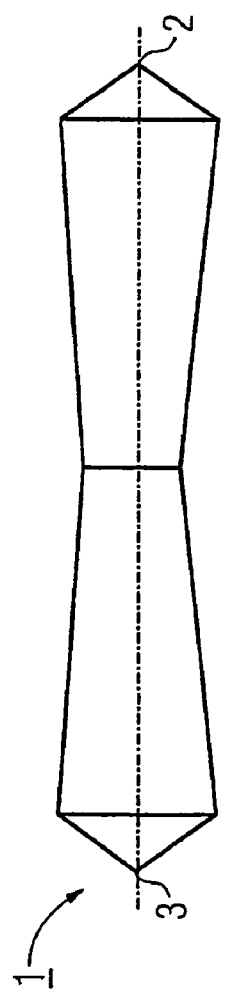
Figure 5A:
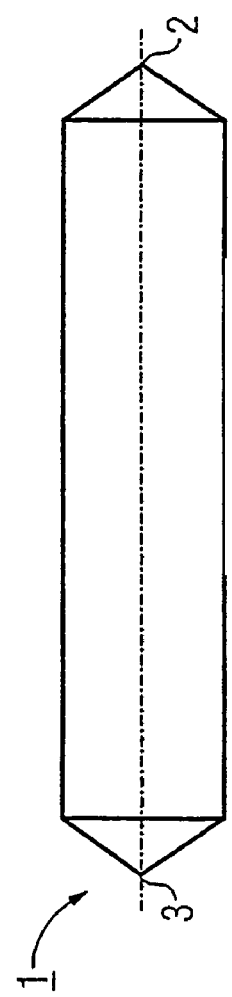

| | | |
|---|---|---|
| DE | 20316350 U | 4/2004 |
| FR | 564501 A | 1/1924 |
| GB | 186935 A | 11/1923 |
| GB | 434383 A | 8/1935 |
| JP | 61050706 | 3/1986 |
| JP | 63306811 A | 12/1988 |
| JP | 2001121332 A | 5/2001 |
| WO | WO9740953 | 11/1997 |
| WO | WO9809756 | 3/1998 |

* cited by examiner

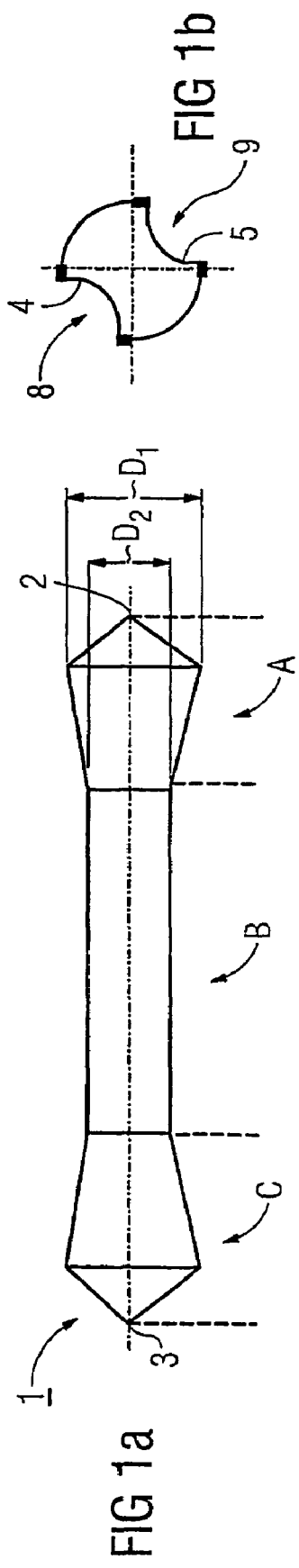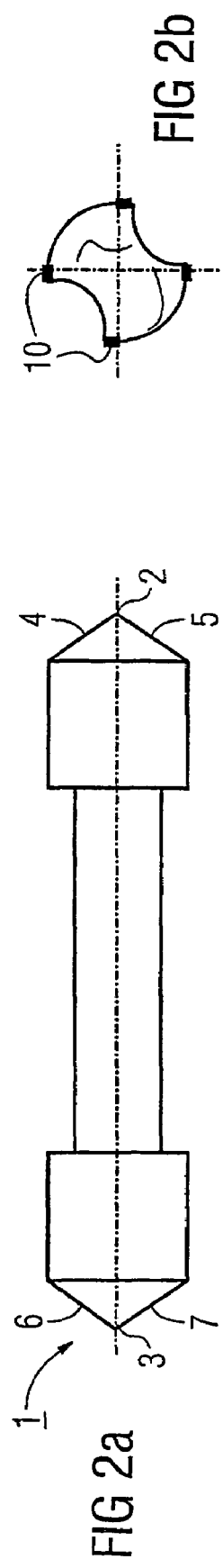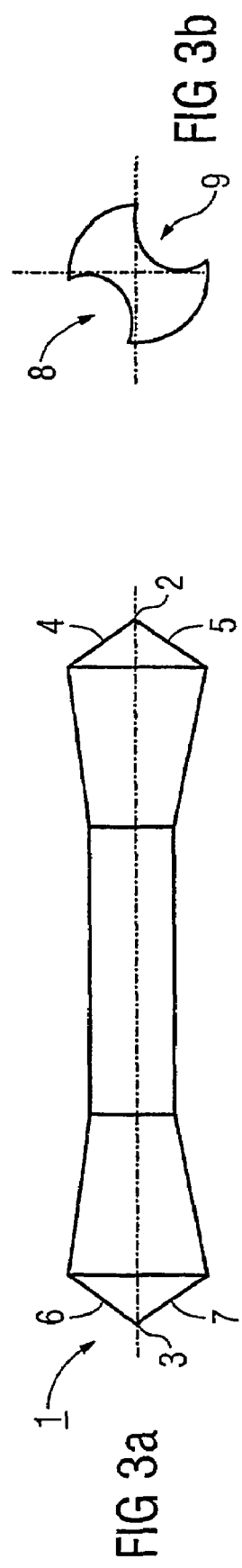

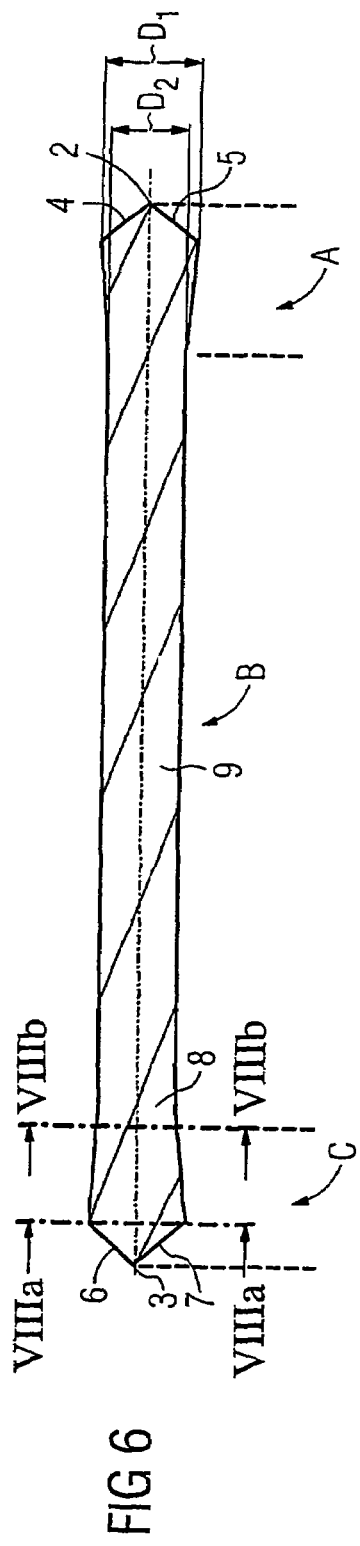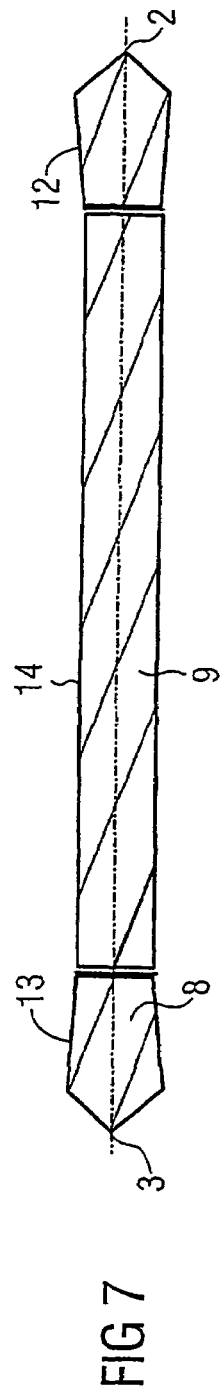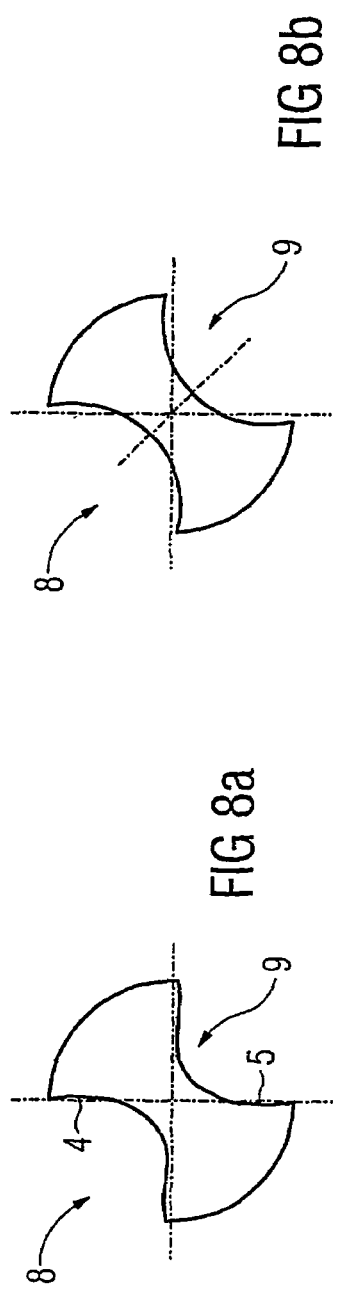

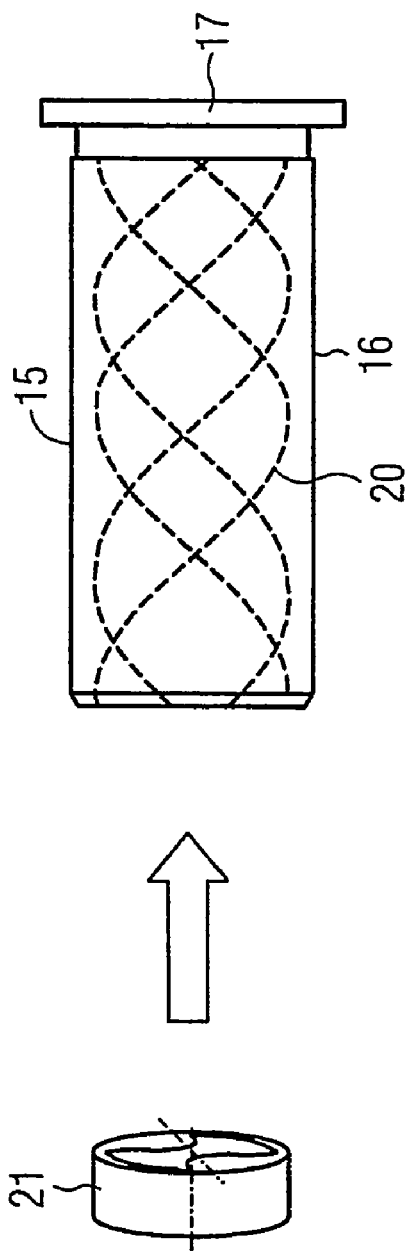
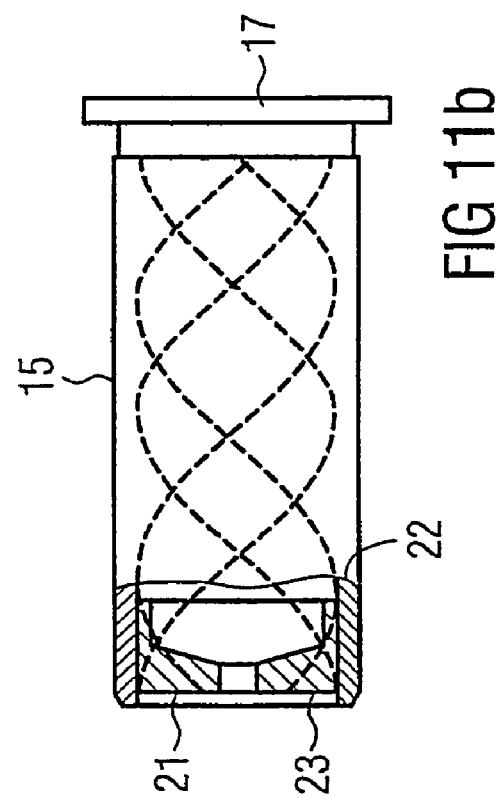
FIG 11a
FIG 11b

DRILLING TOOL

CONTINUING APPLICATION DATA

This application is a continuing application of International Patent Application No. PCT/EP2004/008987, filed on Aug. 11, 2004, which claims priority from Federal Republic of Germany Patent Application No. 103 37 203.2, filed on Aug. 13, 2003. International Patent Application No. PCT/EP2004/008987 was pending as of the filing date of this application. The United States was an elected state in International Patent Application No. PCT/EP2004/008987.

This invention relates to a drilling tool with two drill bits located on its opposite ends, wherein the drilling tool has a first drill bit and at least two forward cutting edges, a second drill bit and at least two rear cutting edges, and chip flutes (8, 9) that run from each of the forward cutting edges to a rear cutting edge, as described in the introduction to Claim 1. The term "drilling tool" as used here means a drill that is designed for the creation of a boring with a constant diameter, as well as, for example, a stepped drill or a combination drill and countersink tool.

A drilling tool of the type described above is known, for example, from DE 1 752 616 A1. This double-tipped drilling tool is manufactured from an extruded profile, which is divided into individual small rods. As a result of the extrusion process, the chip flutes of the drilling tool have an unvarying profile over its length.

A drilling tool, in particular one that is used for machining metal workpieces, frequently has at least one replaceable cutting insert. The base body, to which the cutting insert can be fastened, can therefore be used beyond the useful life of the cutting insert. Drilling tools with replaceable cutting inserts, however, are typically limited to larger diameters. As a rule, one-piece drills are used for drilling smaller-diameter borings, for example up to 10 mm. In spite of the fact that they can generally be re-ground and re-used, their useful life is significantly shorter than that of a drill with a replaceable cutting insert or a plurality of replaceable cutting inserts.

The object of the invention is to indicate a drilling tool which has a particularly long useful life, in particular also at tool diameters up to 10 mm.

The invention teaches a drilling tool that has the following characteristics. The drilling tool has a drill bit on each end, whereby each drill bit has at least two cutting edges. Spiral chip flutes extend continuously from the cutting edges on the one drill bit to the cutting edges on the other drill bit. In the vicinity of the drill bits, each of the at least two chip flutes corresponding to the number of cutting edges per drill bit have in themselves an asymmetrical shape. As a result of the asymmetrical configuration of each chip flute, these tools are particularly well suited for a cutting geometry with controlled chip formation that is particularly advantageous for metal-removing operations. The asymmetrical profile of the chip flutes makes a transition, not later than toward the middle of the drilling tool, into a symmetrical profile, so that as the chip flutes proceed further toward the second drill bit, they once again assume a non-symmetrical shape, which is preferably the same as the shape at the first drill bit. As a variant from this configuration, the geometry of the second drill bit can also differ from the geometry of the first drill bit, and/or can also have an at least slightly different diameter, whereby in each case an asymmetrical profile of each chip flute is present in the areas adjacent to the drill bits and a symmetrical chip flute profile is present in an area that lies in between. The useful life of the drilling tool, which is also called a drill below, is therefore extended to almost twice that of a conventional drill that has only one drill bit.

The drilling tool, regardless of whether it is made out of a single material or of a plurality of different materials, is preferably provided so that it cannot be disassembled, for example for the extraction of a cutting insert. Possible materials that can be used as materials for the drill are all the materials or material combinations, with or without coatings, that are used in the prior art for conventional borers that have a single drill bit. If the drill bits are formed by separate tool bits, the bits are preferably permanently connected with the base body of the drilling tool, for example by soldering, whereby the tool bits are preferably made from a material that is harder than the material of the base body. In this embodiment, too, the chip flutes extend over the entire drilling tool, including the base body.

In one preferred configuration, the drilling tool has cooling channels which each extend from one drill bit to the opposite drill bit.

Each cooling channel is thereby associated with an individual cutting edge on each drill bit, whereby the function of the inlet and outlet openings of the cooling channels is interchangeable.

In the vicinity of the drill bits, the drilling tool has a shape, for example, that corresponds to one of the twist drills known from EP 0 249 104 A1, DE 100 275 544 A1 or DE 199 55 172 A1. Twist borers of this type are characterized by, among other things, good pipe tapping properties and possible high feeds while still achieving a long useful life.

The drilling tool, together with a chucking device, preferably forms a drilling device having the following characteristics. One part of the chucking device is a chucking sleeve which has an internal profiling that matches at least in part the shape of the chip flutes of the drill and thus makes possible a particularly precise chucking. In this case, preferably at least one opening cross section of the chucking sleeve at least in part matches the shape of the chip flutes. As a result, a penetration of chips into the chucking sleeve is prevented. Furthermore, an inner profiling of the chucking sleeve, which extends over the overall length, i.e. at least the major portion of the length of the chucking sleeve and matches the geometry of the drilling tool, makes possible a reliable chucking of the drilling tool, which is comparable to the chucking of a conventional drilling tool on the shank of a part of the tool without flutes.

Alternatively to the configuration disclosed herein above, a conventional draw-in collet chuck without internal profiling is also suitable for chucking the drilling tool, provided that the expansion capability of the collet is large enough to bridge any potential jumps or transitions in the diameter of the borer.

In accordance with one preferred development of the chucking device disclosed herein above, a sealing washer is provided that interacts with the chucking sleeve, and in particular is inserted in it or pushed over it, and by means of which an improved seal with respect to coolant-lubricant can be achieved. The sealing washer is preferably located on the side of the chucking sleeve facing the rear drill bit. As a result, no coolant lubricant or practically no coolant lubricant that is introduced into the drilling tool gets into the chucking sleeve or outward between the drill and the chucking sleeve. The term "rear drill bit" in this context means the drill bit that under current operating conditions is not being used for chip removal. The sealing washer located in this area also provides mechanical protection for the rear drill bit, which may be damaged, for example, by the vibrations that occur during chip removal operation.

To be able to insert the chucking sleeve easily into a conventional chuck, e.g. a hydraulic expansion chuck, the chucking sleeve preferably has a constant outside diameter. The material for the chucking sleeve, which in this case is also called a chucking shank, is preferably plastic or another flexible material such as rubber. The inside surface of the chucking sleeve is preferably configured so that the chucking sleeve simultaneously performs the function of a sealing washer. In this configuration, the drill is provided so that it can be screwed into the chucking shank. The chucking shank can either have a constant inner profiling over its entire length or can be provided with a blind hole to receive the drilling tool. When the chucking shank is realized with a blind hole, cooling lubricant can be fed to the drilling tool from outside. Likewise, however, it is also possible, instead of the blind hole, an area with a smaller inside diameter is provided through which coolant lubricant can also be fed in axially to the drill.

The advantage of the invention is, among other things, that a drill with two bits and continuous chip flutes can be used by means of a chucking sleeve coordinated with it, can be used in the same manner as a conventional borer that has only one bit, whereby in comparison to a conventional drill, there are no restrictions on its use, e.g. with regard to the maximum drilling depth.

Figure 9B:
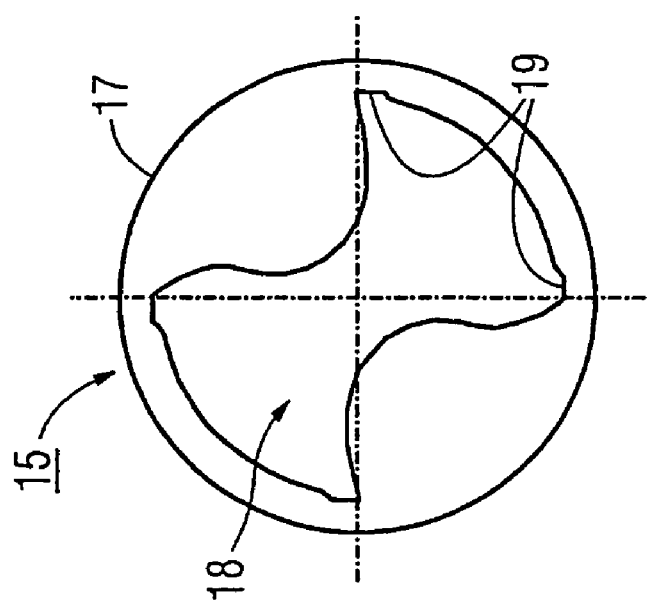
Figure 9A:
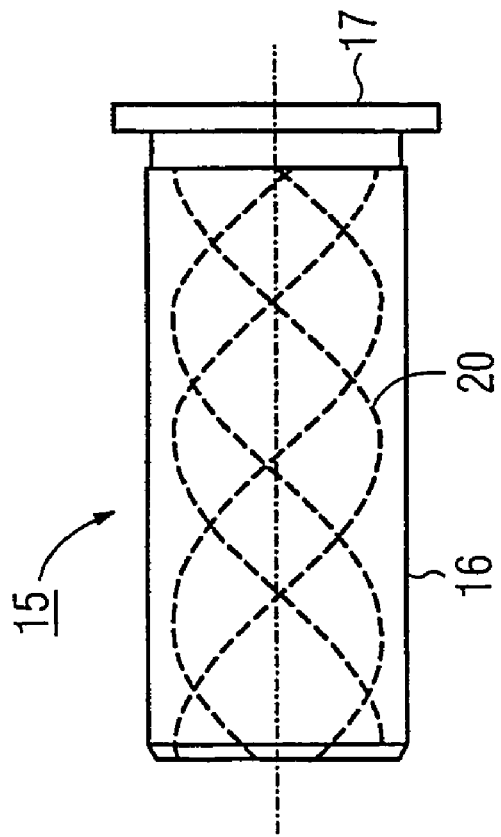
Figure 10C:
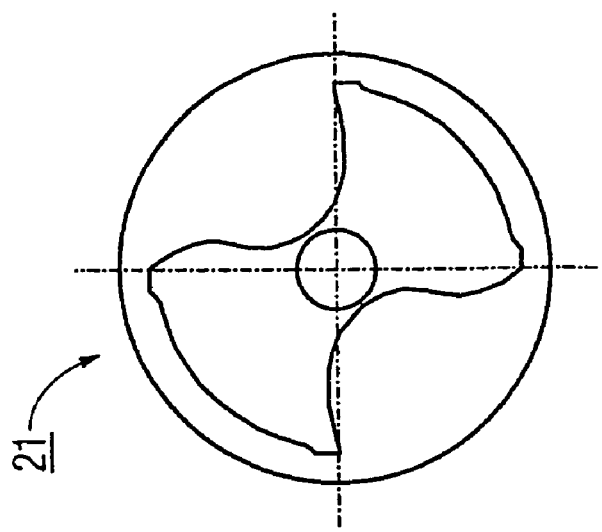
Figure 10B:
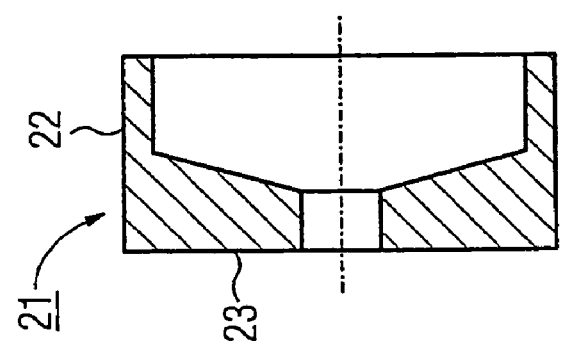
Figure 10A:
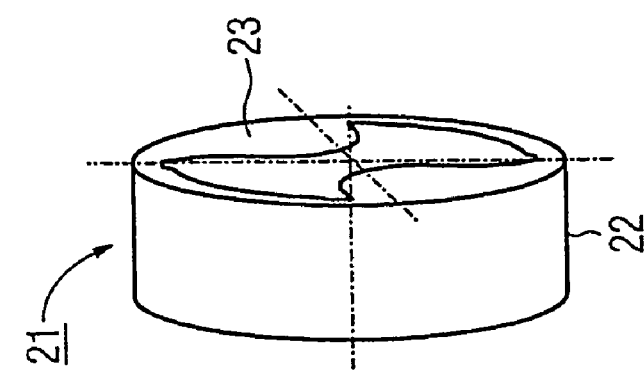
Figure 12A:
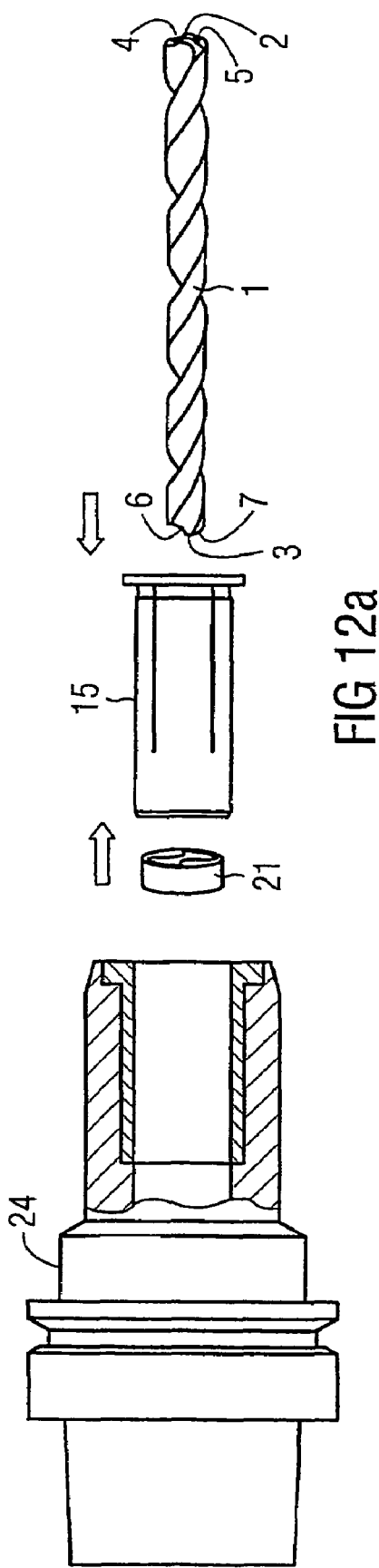
Figure 12B:
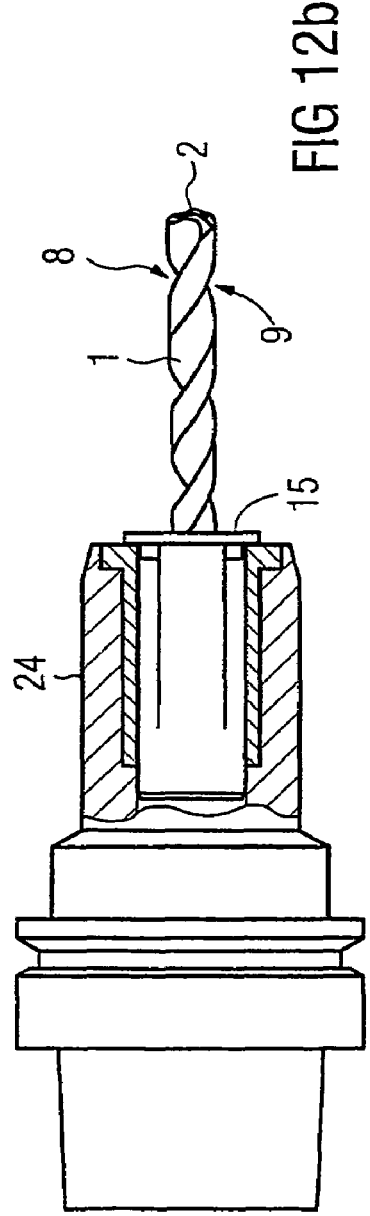
Figure 13:
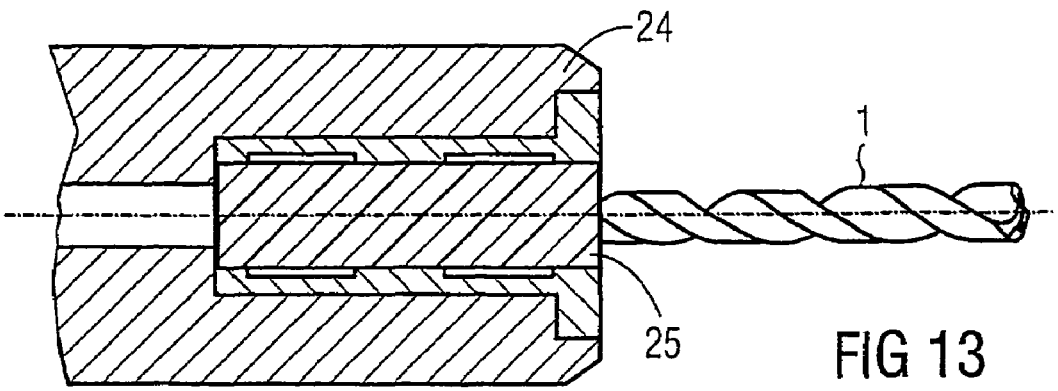
Figure 14A:
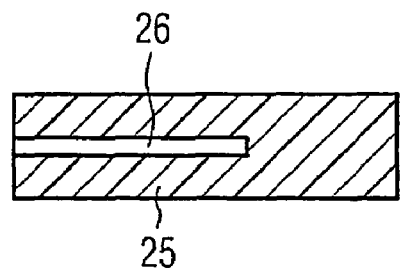
Figure 14B:
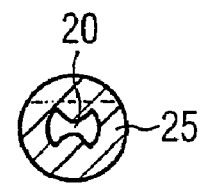
Figure 15A:
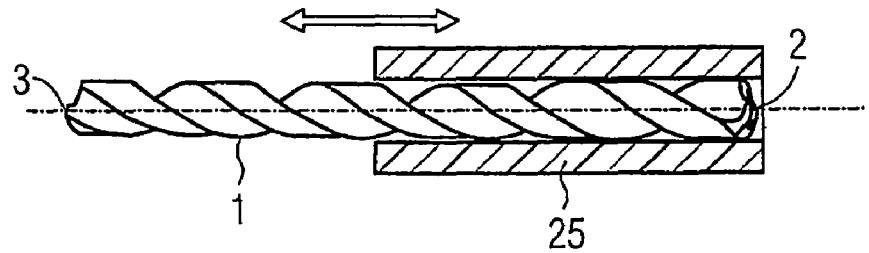
Figure 15B:
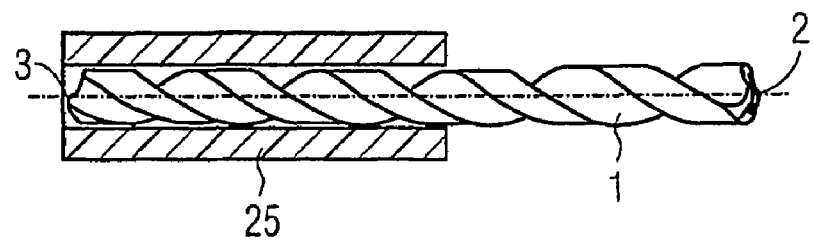
Figure 16A:
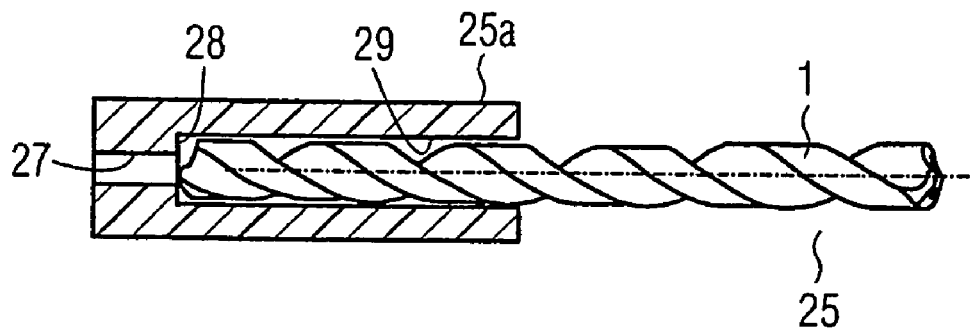
Figure 16B:
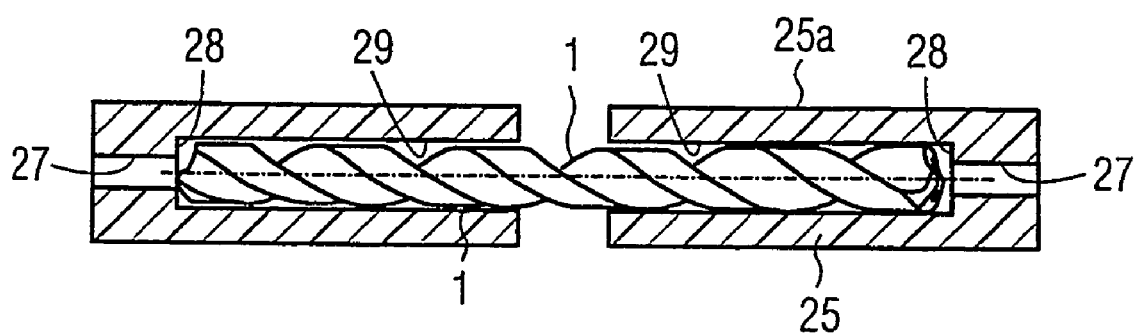

Several exemplary embodiments of the invention are described in greater detail below with reference to the accompanying drawings, in which:

FIGS. 1a, 1b to FIGS. 5a, 5b each show, in schematic sections, an exemplary embodiment of a drilling tool with two drill bits, FIGS. 6 and 7 each show a schematic side view of an additional exemplary embodiment of a drilling tool with two drill bits, FIGS. 8a, 8b different cross sections of the drilling tool illustrated in FIG. 6, FIGS. 9a, 9b a chucking sleeve for a drilling tool with two drill bits and continuous chip flutes, FIGS. 10a to 10c a sealing washer for a chucking sleeve as illustrated in FIGS. 9a, 9b, FIGS. 11a, 11b, an arrangement with a chucking sleeve as illustrated in FIGS. 9a, 9b and a sealing washer as illustrated in FIGS. 10c to 10c, FIGS. 12a, 12b an arrangement with an expansion chuck, a chucking sleeve as illustrated in FIGS. 9a, 9b, a sealing washer as illustrated in FIG. 10a to 10c and a drill with two drill bits, FIG. 13 an expansion chuck with a chucked borer, FIG. 14a, 14b a plastic shank that can be chucked in an expansion chuck as illustrated in FIG. 13, FIGS. 15a, 15b a drill in a plastic shank in different arrangements, and FIGS. 16a, 16b show a drill in a plastic shank in an alternative embodiment.

Parts in the different figures that are identical, analogous or perform the same function are identified using the same numbers in all the figures.

FIGS. 1a and 1b to 5a and 5b each show an exemplary embodiment of a drilling tool 1 that has two drill bits 2, 3. Each drilling tool 1 is realized in one piece and has a first area A adjacent to the first drill bit 2, a contiguous middle area B and a rear area C that is adjacent to the second drill bit 3. In the exemplary embodiments illustrated in FIGS. 1a and 1b to 4a and 4b, a reduced diameter $D_2$ in the middle area B is smaller than the tool diameter $D_1$. Consequently, in particular in the particularly preferred exemplary embodiment illustrated in FIGS. 2a and 2b, a set of different tools can each have different tool diameters $D_1$, which are dictated in each case by the outer areas A, C of the drilling tool 1, but identical reduced diameters $D_2$. All the tools of the set are thus suitable for the same chucking device. The cutting edges of each drilling tool 1 are identified by the reference numbers 4, 5, 6, 7, and the corresponding chip flutes by the reference numbers 8, 9. In each of the exemplary embodiments illustrated in FIGS. 1a and 1b and 2a and 2b, there are also four guide faces 10. Two cooling channels 11 are shown simply by way of example in the exemplary embodiment illustrated in FIGS. 5a and 5b, which are preferably also present in all the other exemplary embodiments.

FIGS. 6 and 7 illustrate the shape of the chip flutes 8, 9 which extend over the entire length of each drilling tool 1. While in the exemplary embodiment illustrated in FIG. 6, the drilling tool 1 is realized in one piece, for example, and is made of carbide coated using the CVD (Chemical Vapor Deposition) method, in the exemplary embodiment illustrated in FIG. 7, two tool bits 12, 13, which can, for example, be coated or uncoated tungsten carbide, are permanently connected with a base body 14 which forms the middle area B of the drilling tool 1, in particular by soldering to the base body 14.

FIGS. 8a and 8b show two different cross sections of the drilling tool 1 illustrated in FIG. 6. In the vicinity of the maximum tool diameter $D_1$, the drilling tool 1 has the asymmetrical profile of the chip flutes 8, 9 illustrated in FIG. 8a, which is optimized for the cutting method and chip formation. In this case, each chip flute 8, 9 is asymmetrical in itself, whereby the shape of the first chip flute 8 is the same as the shape of the second chip flute 9. On the other hand, in the vicinity of the reduced diameter $D_2$, as illustrated in FIG. 8b, the cross section of each chip flute 8, 9 is symmetrical overall in comparison to the outer areas A, C of the drill 1. The chip flutes 8, which are thereby optimized in terms of chip transport, have a constant cross section in the entire middle area B. The transition between the area of each chip flute 8, 9 that faces the drill bits 2, 3 and is in itself asymmetrical, and the middle, symmetrical area of each chip flute 8, 9 is continuous, i.e. without edges or discontinuities.

FIGS. 9a and 9b show a chucking sleeve 15 which is suitable for a drilling tool of the type illustrated in FIG. 6 or 7, for example. The chucking tool 15 is assembled from a cylinder body 16 and a cover 17, which has an opening cross section 18 that approximately matches the shape of the chip flutes 8, 9. The opening cross section 18, on the guide faces 10, has coordinated flutes 19, which are indicated as dotted lines in FIG. 9a as a portion of an inner profiling, and are continued into the cylinder body 16.

FIGS. 10a to 10c illustrate a sealing washer 21 which is made of an elastomer, which has an edge segment 22 in the shape of a cylinder jacket, and a sealing surface 23 bordered by said edge segment and matching the cross section of the chip flutes 8, 9.

The function of the clamping sleeve 15 and of the sealing washer 21 is illustrated in greater detail in FIGS. 11a, 11b, 12a and 12b. In the figures, the drilling tool 1 is chucked in an expansion chuck 24 by means of the chucking sleeve 15, in which the sealing washer 21 is inserted on the side facing away from the drill bit 2 used for the chip removal. The drilling tool 1 can be chucked in axially different positions in the expansion chuck 24, which can also theoretically be replaced by another type of chuck, such as a draw-in collet chuck. In general, the cutting edges 4, 5 which are used during the cutting operation are also called the forward cutting edges, and the cutting edges 6, 7 that are located on the inactive drill bit 3 that is kept in reserve are called the rear cutting edges. The cooling lubricant that is fed inside the expansion chuck 24 to the drilling tool 1 can flow at most only in a small proportion through the chip flutes 8, 9, and is thereby conducted through the cooling channels 11, which are not visible in this exemplary embodiment, to the drill bit 2.

FIG. 13 shows, in an illustration that is analogous to FIG. 12*b*, a dual-bit drilling tool 1 chucked in an expansion chuck 24. Instead of the chucking sleeve 15 in FIG. 12*b*, however, a plastic shank 25 is used. The plastic shank 25 is shown in isolation in a schematic side and front view in FIGS. 14*a* and 14*b*. The front view (FIG. 14*b*) shows that the cross section of the plastic shank 25 is theoretically identical to the cross section of the sealing washer 21 (FIGS. 10*a* to 10*c*), i.e. it has an opening surfaces that matches the cross section of the drill 1. To make it easier to screw the drill 1 into the plastic shank 25 and in particular to make the plastic shank 25 suitable for use with drills 1 of a different diameter, slots 26 in the axial direction are provided over slightly more than one-half of the length of the plastic shank 25. The plastic shank 25 illustrated in FIGS. 14*a* and 14*b* is realized for a drilling tool 1 with a twist angle of 30 degrees of the chip flutes. The slots 26 are unnecessary in some cases, in particular if the plastic shank 25 is provided only for one specific drill diameter.

FIGS. 15*a* and 15*b* show the longitudinal section of the plastic shank 25. These figures, also show, as indicated by the double arrow, that the plastic shank 25 can be optionally located on each of the two sides of the drilling tool 1. In that case, one of the drill bits 2 is approximately flush with the end surface of the plastic shank 25. In a variant of the illustrated exemplary embodiment, the drill can also be axially shifted to any position inside the shank.

FIGS. 16*a* and 16*b* show, in views that are similar to FIGS. 15*a* and 15*b*, a drilling tool 1 held in a plastic shank. In contrast to the plastic shank 25 illustrated in FIGS. 13 to 15*b*, the plastic shank 25*a* shown in FIGS. 16*a* and 16*b* does not have a constant inside diameter, but a tapered diameter 27. When the drilling tool 1 is screwed all the way into the plastic shank 25*a*, its bit 2 is in contact against a peripheral step 28 which separates the tapered segment 27 from the remaining, untapered inner wall 29 of the plastic shank 25*a*. In contrast to the exemplary embodiments illustrated in FIGS. 13 to 15*b*, the drill bit is thereby at some distance from the end surface of the plastic shank 25. The tapered segment 27 can be used to feed coolant lubricant to the drilling tool 1, and therefore forms a coolant lubricant channel, if necessary. If there is no need to feed in a coolant lubricant, the plastic shank 25*a* can be completely closed at the point of the tapered segment 27.

The invention claimed is:

1. A twist drill for cutting metal, said twist drill comprising a maximum diameter of at most ten millimeters and an integral body, said twist drill comprising:
    a first drill bit portion comprising at least two cutting edges;
    a second drill bit portion comprising at least two cutting edges;
    a middle portion disposed between said first drill bit portion and said second drill bit portion;
    each of said first drill bit portion and said second drill bit portion and said middle portion together form said integral body;
    at least two helical chip flutes being disposed to run from said at least two cutting edges of said first drill bit portion to said at least two cutting edges of said second drill bit portion;
    said chip flutes each comprising a first portion disposed in said first drill bit portion, a second portion disposed in said second drill bit portion, and a third portion disposed in said middle portion;
    said first portion of each of said chip flutes comprising an asymmetrical cross-sectional profile about a radius of said twist drill intersecting at approximately the middle of a corresponding one of said chip flutes;
    said second portion of each of said chip flutes comprising an asymmetrical cross-sectional profile about a radius of said twist drill intersecting at approximately the middle of a corresponding one of said chip flutes; and
    said third portion of each of said chip flutes comprising a symmetrical cross-sectional profile about a radius of said twist drill intersecting at approximately the middle of a corresponding one of said chip flutes.

2. The twist drill according to claim 1, wherein:
    each of said first portion and said second portion of each of said chip flutes comprises a cutting edge and a non-cutting edge;
    said cross-sectional profile of each of said first portion and said second portion of each of said chip flutes comprises a first profile section adjacent said cutting edge and a second profile section adjacent said non-cutting edge;
    said first profile section comprises a portion comprising a substantially curvilinear, concave profile which defines a positive rake angle; and
    said second profile section comprises a portion comprising a substantially convex profile.

3. The twist drill according to claim 2, in combination with a chucking device comprising a chucking sleeve, comprising at least one of (A), (B), (C), (D), (E), (F), (G), (H), (I), (J), and (K): (A) said cross-sectional profile of each of said chip flutes in said first portion is identical to said cross-sectional profile of each of said chip flutes in said second portion; (B) each of said first and second drill bit portions comprise originally individual tool bits which have been permanently connected to said middle portion; (C) said twist drill comprises cooling channels; and said cooling channels comprise openings disposed adjacent a corresponding one of each of said at least two cutting edges on each of said first and second drill bit portions; (D) said middle portion comprises a diameter less than the maximum diameter of said twist drill; (E) said chucking sleeve comprising an inner surface; and said inner surface comprises a profile that at least partly matches the profile of said at least two chip flutes; (F) said chucking sleeve comprises an opening configured to receive said twist drill; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; and (K) said chucking sleeve comprises a blind hole to receive said twist drill.

4. The twist drill according to claim 3, in combination with a chucking device comprising a chucking sleeve, comprising all of (A), (B), (C), (D), (E), (F), (G), (H), (I), (J), and (K): (A) said cross-sectional profile of each of said chip flutes in said first portion is identical to said cross-sectional profile of each of said chip flutes in said second portion; (B) each of said first and second drill bit portions comprise originally individual tool bits which have been permanently connected to said middle portion; (C) said twist drill comprises cooling channels; and said cooling channels comprise openings disposed adjacent a corresponding one of each of said at least two cutting edges on each of said first and second drill bit portions; (D) said middle portion comprises a diameter less than the maximum diameter of said twist drill; (E) said chucking sleeve comprises an inner surface; and said inner surface comprises a profile that at least partly matches the profile of said at least two chip flutes; (F) said chucking sleeve comprises an opening configured to receive said twist drill; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; and (K) said chucking sleeve comprises a blind hole to receive said twist drill.

5. A twist drill comprising:
a first drill bit portion comprising at least two cutting edges;
a second drill bit portion comprising at least two cutting edges;
a middle portion disposed between said first drill bit portion and said second drill bit portion;
each of said first drill bit portion and said second drill bit portion and said middle portion together form an integral body;
said first drill bit portion comprising chip flutes comprising an asymmetrical cross-sectional profile about a radius of said twist drill intersecting at approximately the middle of a corresponding one of said chip flutes;
said second drill bit portion comprising chip flutes comprising an asymmetrical cross-sectional profile about a radius of said twist drill intersecting at approximately the middle of a corresponding one of said chip flutes; and
said middle portion comprising chip flutes comprising a symmetrical cross-sectional profile about a radius of said twist drill intersecting at approximately the middle of a corresponding one of said chip flutes.

6. The twist drill according to claim 5, wherein:
said chip flutes in said first drill bit portion and said second drill bit portion each comprise a cutting edge and a non-cutting edge;
said asymmetrical cross-sectional profile of said chip flutes in said first drill bit portion and said second drill bit portion comprises a first profile section adjacent said cutting edge and a second profile section adjacent said non-cutting edge;
said first profile section comprises a portion comprising a substantially curvilinear, concave profile; and
said second profile section comprises a portion comprising a substantially convex profile.

7. The twist drill according to claim 6, in combination with a chucking device comprising a chucking sleeve, comprising at least one of (A), (B), (C), (D), (E), (F), (G), (H), (I), (J), (K), (L), (M), and (N): (A) said cross-sectional profile of each of said chip flutes in said first drill bit portion is identical to said cross-sectional profile of each of said chip flutes in said second drill bit portion; (B) each of said first and second drill bit portions comprise originally individual tool bits which have been permanently connected to said middle portion; (C) said twist drill comprises cooling channels; and said cooling channels comprise openings disposed adjacent a corresponding one of each of said at least two cutting edges on each of said first and second drill bit portions; (D) said middle portion comprises a diameter less than the maximum diameter of said twist drill; (E) said chucking sleeve comprises an inner surface; and said inner surface comprises a profile that at least partly matches the profile of said at least two chip flutes; (F) said chucking sleeve comprises an opening configured to receive said twist drill; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; (K) said chucking sleeve comprises a blind hole to receive said twist drill; (L) said chip flutes comprise helical chip flutes; (M) said chip flutes of said first drill bit portion, said second drill bit portion, and said middle portion together form chip flutes disposed to run from said at least two cutting edges of said first drill bit portion to said at least two cutting edges of said second drill bit portion; and (N) said cutting edge of each of said chip flutes in said first drill bit portion and second drill bit portion define a positive rake angle.

8. The twist drill according to claim 7, in combination with a chucking device comprising a chucking sleeve, comprising all of (A), (B), (C), (D), (E), (F), (G), (H), (I), (J), (K), (L), (M), and (N): (A) said cross-sectional profile of each of said chip flutes in said first drill bit portion is identical to said cross-sectional profile of each of said chip flutes in said second drill bit portion; (B) each of said first and second drill bit portions comprise originally individual tool bits which have been permanently connected to said middle portion; (C) said twist drill comprises cooling channels; and said cooling channels comprise openings disposed adjacent a corresponding one of each of said at least two cutting edges on each of said first and second drill bit portions; (D) said middle portion comprises a diameter less than the maximum diameter of said twist drill; (E) said chucking sleeve comprises an inner surface; and said inner surface comprises a profile that at least partly matches the profile of said at least two chip flutes; (F) said chucking sleeve comprises an opening configured to receive said twist drill; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; (K) said chucking sleeve comprises a blind hole to receive said twist drill; (L) said chip flutes comprise helical chip flutes; (M) said chip flutes of said first drill bit portion, said second drill bit portion, and said middle portion together form chip flutes disposed to run from said at least two cutting edges of said first drill bit portion to said at least two cutting edges of said second drill bit portion; and (N) said cutting edge of each of said chip flutes in said first drill bit portion and second drill bit portion define a positive rake angle.

9. A drilling tool comprising: a first drill bit (2) and at least two forward cutting edges (4, 5); a second drill bit (3) and at least two rear cutting edges (6, 7); chip flutes (8, 9) that run from each of the forward cutting edges (4, 5) to a corresponding one of the rear cutting edges (6, 7); and each of the chip flutes (8, 9) is a spiral and is realized so that its cross-sectional profile is in itself asymmetrical about a radius of said twist drill in an area (A) adjacent to the forward drill bit (2), in itself symmetrical about a radius of said twist drill in a middle area (B) that connects said drill bits, and in itself asymmetrical about a radius of said twist drill in an area (C) adjacent to the rear drill bit (3).

10. The drilling tool according to claim 9, wherein the chip flutes (8, 9) are configured to be identical in the areas (A, C) adjacent to the drill bits (2, 3).

11. The drilling tool according to claim 10, wherein the drill bits (2, 3) are each formed by a tool bit (12, 13) connected with a base body (14).

12. The drilling tool according to claim 11, wherein the drilling tool comprises a cooling channel (11) on each cutting edge (4, 5, 6, 7) on both drill bits (2, 3).

13. The drilling tool according to claim 12, wherein the drilling tool has a reduced diameter ($D_2$) in the middle area (B) compared to the tool diameter ($D_1$).

14. The drilling tool according to claim 13 in combination with a drilling device, wherein the drilling device comprises a chucking device with a chucking sleeve (15, 25, 25a) with an inner profiling (20) that at least partly matches the shape of the chip flutes (8, 9).

15. The combination according to claim 14, wherein an opening cross section (18) of the chucking sleeve (15, 25, 25a) at least partly matches the shape of the chip flutes (8, 9).

16. The combination according to claim 15, comprising a sealing washer (21) that interacts with the chucking sleeve (15).

17. The combination according to claim 16, wherein the chucking sleeve (25, 25a) is realized in the form of a chuck shank with a constant outside diameter.

18. The combination according to claim 17, wherein the chucking sleeve (15, 25, 25a) has an axial slot (26).

19. The combination according to claim 18, wherein the chucking sleeve (15, 25, 25a) has areas that have different inside diameters.

20. The combination according to claim 19, wherein the chucking sleeve (15, 25, 25a) has a blind hole to receive the drilling tool.

\* \* \* \* \*